US006932735B2

(12) United States Patent
Kao et al.

(10) Patent No.: US 6,932,735 B2
(45) Date of Patent: Aug. 23, 2005

(54) SIX-SPEED PLANETARY TRANSMISSION MECHANISMS WITH TWO CLUTCHES AND THREE BRAKES

(75) Inventors: Chi-Kuan Kao, Troy, MI (US); Patrick Benedict Usoro, Troy, MI (US); Madhusudan Raghavan, West Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/995,846

(22) Filed: Nov. 23, 2004

(65) Prior Publication Data

US 2005/0070398 A1 Mar. 31, 2005

Related U.S. Application Data

(63) Continuation of application No. 10/151,262, filed on May 20, 2002.

(60) Provisional application No. 60/295,944, filed on Jun. 5, 2001.

(51) Int. Cl.[7] .................................................. F16H 3/62

(52) U.S. Cl. ........................ 475/276; 475/280; 475/296

(58) Field of Search ................................ 475/269, 275, 475/276, 280, 282, 284, 286, 296, 311, 314, 317, 320, 323, 326

(56) References Cited

U.S. PATENT DOCUMENTS 3,941,013 A 3/1976 Miller ........................ 475/276
4,046,031 A 9/1977 Ott et al. .................... 475/280
4,070,927 A 1/1978 Polak .......................... 74/768
4,395,925 A 8/1983 Gaus .......................... 475/284
5,063,813 A 11/1991 Lentz ......................... 477/131
5,098,357 A 3/1992 Asada et al. ................ 475/284
5,106,352 A 4/1992 Lepelletier .................. 475/280
5,295,924 A 3/1994 Beim ......................... 475/275
5,542,889 A 8/1996 Pierce et al. ................ 475/275
5,599,251 A 2/1997 Beim et al. ................. 475/275
6,071,208 A 6/2000 Koivunen ................... 475/275
6,083,135 A 7/2000 Baldwin et al. ............ 475/276
6,530,858 B1 3/2003 Usoro et al. ................ 475/296
6,572,507 B1 6/2003 Korkmaz et al. ........... 475/276
6,752,737 B2 * 6/2004 Ishimaru et al. ............ 475/275
6,802,795 B2 * 10/2004 Miyazaki et al. ........... 475/275

FOREIGN PATENT DOCUMENTS

JP 4-290650 * 10/1992
JP 404290649 10/1992
WO WO 00/57082 9/2000

* cited by examiner

*Primary Examiner*—Ha Ho
(74) *Attorney, Agent, or Firm*—Kathryn A. Maara

(57) ABSTRACT

A family of transmissions includes three planetary gearsets and five torque-transmitting mechanisms. Each family member may be employed in a powertrain to provide six forward speed ratios and one reverse speed ratio when the torque-transmitting mechanisms are engaged in combinations of two in a selected manner. Each planetary gearset includes three planetary members. The first member of the first planetary gearset is continuously connected with the first member of the second planetary gearset. The second member of the first planetary gearset is continuously connected with a first member of the third planetary gearset. The second member of the second planetary gearset is continuously connected with the second member of the third planetary gearset. An input shaft is continuously connected with one of the members of the planetary gearsets and an output shaft is continuously connected with another member of the planetary gearsets.

7 Claims, 11 Drawing Sheets

| | Ratios | 254 | 256 | 258 | 250 | 252 |
|---|---|---|---|---|---|---|
| Reverse | 2.93 | X | | | | X |
| Neutral | 0 | X | | | | |
| 1 | 4.66 | X | X | | | |
| 2 | 2.92 | | X | X | | |
| 3 | 1.83 | | X | | | X |
| 4 | 1.4 | | X | | X | |
| 5 | 1 | | | | X | X |
| 6 | 0.75 | | | X | X | |

(X=engaged clutch)

$\frac{\text{RING GEAR}}{\text{SUN GEAR}}$ =TOOTH RATIO: $\frac{R_1}{S_1}=2.33$, $\frac{R_2}{S_2}=2.52$, $\frac{R_3}{S_3}=2.93$

| Ratio Spread | 6.25 |
|---|---|
| Ratio Steps | |
| Rev/1 | -0.63 |
| 1/2 | 1.6 |
| 2/3 | 1.59 |
| 3/4 | 1.31 |
| 4/5 | 1.4 |
| 5/6 | 1.34 |

| | Ratios | 354 | 356 | 358 | 350 | 352 |
|---|---|---|---|---|---|---|
| Reverse | -2.99 | X | | | X | |
| Neutral | 0 | X | | | | |
| 1 | 4.59 | X | | X | | |
| 2 | 2.94 | | X | X | | |
| 3 | 1.9 | | | X | X | |
| 4 | 1.43 | | | X | | X |
| 5 | 1 | | | | X | X |
| 6 | 0.75 | | X | | | X |

(X=engaged clutch)

$$\frac{\text{RING GEAR}}{\text{SUN GEAR}} = \text{TOOTH RATIO:} \quad \frac{R_1}{S_1} = 2.99, \quad \frac{R_2}{S_2} = 2.30, \quad \frac{R_3}{S_3} = 2.20$$

| Ratio Spread | 6.13 |
|---|---|
| Ratio Steps | |
| Rev/1 | -0.65 |
| 1/2 | 1.56 |
| 2/3 | 1.55 |
| 3/4 | 1.32 |
| 4/5 | 1.43 |
| 5/6 | 1.34 |

| | Ratios | 454 | 456 | 458 | 450 | 452 |
|---|---|---|---|---|---|---|
| Reverse | -3.02 | X | | | X | |
| Neutral | 0 | X | | | | |
| 1 | 5.54 | X | X | | | |
| 2 | 3.48 | | X | X | | |
| 3 | 2.07 | | X | | X | |
| 4 | 1.48 | | X | | | X |
| 5 | 1 | | | | X | X |
| 6 | 0.75 | | | X | | X |

(X=engaged clutch)

$\frac{\text{RING GEAR}}{\text{SUN GEAR}}$ =TOOTH RATIO: $\frac{R_1}{S_1}=1.57$, $\frac{R_2}{S_2}=1.83$, $\frac{R_3}{S_3}=3.02$

| Ratio Spread | 7.37 |
|---|---|
| Ratio Steps | |
| Rev/1 | -0.55 |
| 1/2 | 1.59 |
| 2/3 | 1.68 |
| 3/4 | 1.4 |
| 4/5 | 1.48 |
| 5/6 | 1.33 |

| | Ratios | 554 | 556 | 558 | 550 | 552 |
|---|---|---|---|---|---|---|
| Reverse | -4.3 | X | | X | | |
| Neutral | 0 | | | X | | |
| 1 | 4.46 | | | X | X | |
| 2 | 2.3 | | X | | X | |
| 3 | 1.53 | X | | | X | |
| 4 | 1 | | | | X | X |
| 5 | 0.73 | X | | | | X |
| 6 | 0.63 | | X | | | X |

(X=engaged clutch)

$\frac{\text{RING GEAR}}{\text{SUN GEAR}}$ =TOOTH RATIO: $\frac{R_1}{S_1}=1.57$, $\frac{R_2}{S_2}=2.33$, $\frac{R_3}{S_3}=1.67$

| Ratio Spread | 7.14 |
|---|---|
| Ratio Steps | |
| Rev/1 | -0.96 |
| 1/2 | 1.94 |
| 2/3 | 1.5 |
| 3/4 | 1.53 |
| 4/5 | 1.37 |
| 5/6 | 1.17 |

| | Ratios | 654 | 656 | 658 | 650 | 652 |
|---|---|---|---|---|---|---|
| Reverse | -3.87 | | X | X | | |
| Neutral | 0 | | X | | | |
| 1 | 4.64 | | X | | X | |
| 2 | 2.43 | X | | | X | |
| 3 | 1.55 | | | X | X | |
| 4 | 1 | | | | X | X |
| 5 | 0.72 | | | X | | X |
| 6 | 0.61 | X | | | | X |

(X=engaged clutch)

$$\frac{\text{RING GEAR}}{\text{SUN GEAR}} = \text{TOOTH RATIO:} \quad \frac{R_1}{S_1}=1.54, \quad \frac{R_2}{S_2}=1.52, \quad \frac{R_3}{S_3}=3.02$$

| Ratio Spread | 7.66 |
|---|---|
| Ratio Steps | |
| Rev/1 | -0.83 |
| 1/2 | 1.9 |
| 2/3 | 1.57 |
| 3/4 | 1.55 |
| 4/5 | 1.39 |
| 5/6 | 1.19 |

| | Ratios | 754 | 756 | 758 | 750 | 752 |
|---|---|---|---|---|---|---|
| Reverse | -4.7 | X | | X | | |
| Neutral | 0 | X | | | | |
| 1 | 4.71 | X | | | | X |
| 2 | 2.3 | | X | | | X |
| 3 | 1.51 | | | X | | X |
| 4 | 1 | | | | X | X |
| 5 | 0.75 | | | X | X | |
| 6 | 0.65 | | X | | X | |

(X=engaged clutch)

$\frac{\text{RING GEAR}}{\text{SUN GEAR}}$ =TOOTH RATIO: $\frac{R_1}{S_1}=1.86$, $\frac{R_2}{S_2}=2.31$, $\frac{R_3}{S_3}=1.53$

| Ratio Spread | 7.25 |
|---|---|
| Ratio Steps | |
| Rev/1 | -1 |
| 1/2 | 2.05 |
| 2/3 | 1.51 |
| 3/4 | 1.52 |
| 4/5 | 1.33 |
| 5/6 | 1.16 |

| | Ratios | 854 | 856 | 858 | 850 | 852 |
|---|---|---|---|---|---|---|
| Reverse | -4.24 | X | X | | | |
| Neutral | 0 | | X | | | |
| 1 | 4.27 | | X | | | X |
| 2 | 2.26 | | | X | | X |
| 3 | 1.54 | X | | | | X |
| 4 | 1 | | | | X | X |
| 5 | 0.72 | X | | | X | |
| 6 | 0.61 | | | X | X | |

(X=engaged clutch)

$\frac{\text{RING GEAR}}{\text{SUN GEAR}}$ =TOOTH RATIO: $\frac{R_1}{S_1}=2.21$, $\frac{R_2}{S_2}=1.68$, $\frac{R_3}{S_3}=1.58$

| Ratio Spread | 6.96 |
|---|---|
| Ratio Steps | |
| Rev/1 | -0.99 |
| 1/2 | 1.88 |
| 2/3 | 1.47 |
| 3/4 | 1.54 |
| 4/5 | 1.4 |
| 5/6 | 1.17 |

| | Ratios | 954 | 956 | 958 | 950 | 952 |
|---|---|---|---|---|---|---|
| Reverse | -4.18 | | X | X | | |
| Neutral | 0 | | X | | | |
| 1 | 4.76 | | X | | X | |
| 2 | 2.42 | X | | | X | |
| 3 | 1.55 | | | X | X | |
| 4 | 1 | | | | X | X |
| 5 | 0.73 | | | X | | X |
| 6 | 0.62 | X | | | | X |

(X=engaged clutch)

$\frac{\text{RING GEAR}}{\text{SUN GEAR}}$ =TOOTH RATIO: $\frac{R_1}{S_1}=1.65$, $\frac{R_2}{S_2}=1.58$, $\frac{R_3}{S_3}=1.53$

| Ratio Spread | 7.64 |
|---|---|
| Ratio Steps | |
| Rev/1 | -0.88 |
| 1/2 | 1.97 |
| 2/3 | 1.56 |
| 3/4 | 1.55 |
| 4/5 | 1.37 |
| 5/6 | 1.18 |

| | Ratios | 1054 | 1056 | 1058 | 1050 | 1052 |
|---|---|---|---|---|---|---|
| Reverse | -2.33 | X | | | X | |
| Neutral | 0 | X | | | | |
| 1 | 2.64 | X | | | | X |
| 2 | 1.49 | | X | | | X |
| 3 | 1 | | | | X | X |
| 4 | 0.73 | | | X | | X |
| 5 | 0.54 | | | X | X | |
| 6 | 0.44 | | X | X | | |

(X=engaged clutch)

$\frac{\text{RING GEAR}}{\text{SUN GEAR}}$=TOOTH RATIO: $\frac{R_1}{S_1}=2.33$, $\frac{R_2}{S_2}=1.68$, $\frac{R_3}{S_3}=2.70$

| Ratio Spread | 6.01 |
|---|---|
| Ratio Steps | |
| Rev/1 | -0.89 |
| 1/2 | 1.77 |
| 2/3 | 1.49 |
| 3/4 | 1.37 |
| 4/5 | 1.35 |
| 5/6 | 1.23 |

| | Ratios | 1254 | 1256 | 1258 | 1250 | 1252 |
|---|---|---|---|---|---|---|
| Reverse | -2.3 | X | | | X | |
| Neutral | 0 | X | | | | |
| 1 | 2.74 | X | | | | X |
| 2 | 1.53 | | X | | | X |
| 3 | 1 | | | | X | X |
| 4 | 0.72 | | | X | | X |
| 5 | 0.53 | | | X | X | |
| 6 | 0.43 | | X | X | | |

(X=engaged clutch)

$\frac{\text{RING GEAR}}{\text{SUN GEAR}}$=TOOTH RATIO: $\frac{R_1}{S_1}=2.30$, $\frac{R_2}{S_2}=2.52$, $\frac{R_3}{S_3}=1.60$

| Ratio Spread | 6.39 |
|---|---|
| Ratio Steps | |
| Rev/1 | -0.84 |
| 1/2 | 1.79 |
| 2/3 | 1.53 |
| 3/4 | 1.4 |
| 4/5 | 1.36 |
| 5/6 | 1.23 |

| | Ratios | 1454 | 1456 | 1458 | 1450 | 1452 |
|---|---|---|---|---|---|---|
| Reverse | -3.86 | | | X | X | |
| Neutral | 0 | | | X | | |
| 1 | 6.13 | X | | X | | |
| 2 | 3.77 | | | X | | X |
| 3 | 2.51 | | X | X | | |
| 4 | 1.63 | | X | | | X |
| 5 | 1.3 | | X | | X | |
| 6 | 1 | | | | X | X |

(X=engaged clutch)

$$\frac{\text{RING GEAR}}{\text{SUN GEAR}} = \text{TOOTH RATIO: } \frac{R_1}{S_1} = 1.51, \quad \frac{R_2}{S_2} = 1.58, \quad \frac{R_3}{S_3} = 3.02$$

| Ratio Spread | 6.13 |
|---|---|
| Ratio Steps | |
| Rev/1 | -0.63 |
| 1/2 | 1.63 |
| 2/3 | 1.5 |
| 3/4 | 1.53 |
| 4/5 | 1.25 |
| 5/6 | 1.3 |

SIX-SPEED PLANETARY TRANSMISSION MECHANISMS WITH TWO CLUTCHES AND THREE BRAKES

This application is a Continuation of U.S. application Ser. No. 10/151,262, filed May 20, 2002, which application claims priority from Provisional Application No. 60/295,944, filed Jun. 5, 2001.

TECHNICAL FIELD

The present invention is related to power transmissions and, more particularly, to a family of power transmissions having three planetary gearsets that are controlled by five torque-transmitting mechanisms to provide six forward speed ratios and one reverse speed ratio.

BACKGROUND OF THE INVENTION

Passenger vehicles include a powertrain that is comprised of an engine, multi-speed transmission and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point, during cruising, other than the most efficient point. Therefore manually shifted (countershaft transmissions) were the most popular.

With the advent of three and four speed automatic transmissions, the automatic shifting (planetary gear) transmission increased in popularity with the motoring public. These transmissions improve the operating performance and fuel economy of the vehicle. The increased number of speed ratios reduces the step size between ratios and therefore improves the shift quality of the transmission by making the ratio interchanges substantially imperceptible to the operator under normal vehicle acceleration. It has been suggested that the number of forward speed ratios be increased to five and even six speeds. This has been accomplished in many heavy truck powertrains. Six speed transmissions are disclosed in U.S. Pat. No. 4,070,927 issued to Polak on Jan. 31, 1978, U.S. Pat. No. 6,071,208 issued to Koivunen on Jun. 6, 2000, U.S. Pat. No. 5,106,352 issued to Lepelletier on Apr. 21, 1992, U.S. Pat. No. 6,572,507 issued to Korkmaz et al. on Jun. 3, 2003, and U.S. Pat. No. 5,599,251 issued to Beim and McCarrick on Feb. 4, 1997.

Six speed transmissions offer several advantages over four and five speed transmissions, including improved vehicle acceleration and improved fuel economy. While many trucks employ power transmissions, such as Polak, having six or more forward gear ratios, passenger cars are still manufactured with three and four speed automatic transmissions and relatively few five or six speed devices due to the size and complexity of these transmissions. The Polak transmission provides six forward speed ratios with three planetary gear sets, two clutches and three brakes. The Koivunen and Beim patents utilize six torque transmitting devices including four brakes and two clutches to establish the six forward speed ratios and another reverse ratio. The Lepelletier patent employs three planetary gear sets, three clutches and two brakes to provide six forward speeds. One of the planetary gear sets is positioned and operated to establish two fixed speed input members for the remaining two planetary gear sets. Korkmaz et al. has three planetary gearsets and five torque transmitting mechanisms, which cooperate in combinations of two to provide six forward speeds and one reverse speed. This patent describes six schematics that appear to be variations of a single concept.

SUMMARY OF THE INVENTION

It is an object of the present invention to provide an improved family of transmissions having at least six forward speed ratios and one reverse speed ratio.

In one aspect of the present invention, each family member has three planetary gearsets, and five selectively actuated torque-transmitting mechanisms.

In another aspect of the present invention, each of the planetary gearsets has three members comprised of a sun gear member, a ring gear member, and a planet carrier assembly member.

In yet another aspect of the present invention, each of the planetary gearsets may be either a single pinion type or a double pinion type.

In still another aspect of the present invention, the five torque-transmitting mechanisms are comprised of two clutches and three brakes.

In yet still another aspect of the present invention, the three planetary gearsets are interconnected by three fixed interconnecting members that continuously connect components of the planetary gearsets.

In a further aspect of the present invention, a first of the fixed interconnecting members connects the first member of the first planetary gearset with a first member of the second planetary gearset.

In yet a further aspect of the present invention, a second of the fixed interconnections connects a second member of the first planetary gearset with a first member of the third planetary gearset.

In yet still a further aspect of the present invention, the third of the fixed interconnections continuously connects a second member of the second planetary gearset with a second member of the third planetary gearset.

In another aspect of the present invention, the input shaft and output of the transmission are continuously interconnected with members of one or more of the planetary gearsets.

In yet another aspect of the present invention, the first torque-transmitting mechanism selectively connects a member of the first or second planetary gearset with the transmission housing, the second of the torque-transmitting mechanisms selectively connects a member of the second or third planetary gearset or the first fixed interconnection with the transmission housing, the third of the torque-transmitting mechanisms selectively interconnects a member of the first, second or third planetary gearset with the transmission housing, the fourth of the torque-transmitting mechanisms selectively interconnects a member of the first, second or third planetary gearset with either the input shaft, the output shaft or another member of the first, second or third planetary gearset, and the fifth of the torque-transmitting mechanisms selectively interconnects a member of the first, second or third planetary gearset with either one of the fixed interconnections or another member of the first, second or third planetary gearset.

In still another aspect of the present invention, the five torque-transmitting mechanisms are selectively engaged in combinations of two to control the three planetary gearsets to provide six forward speed ratios and one reverse speed ratio between the input shaft and the output shaft of the transmission.

DESCRIPTION OF THE DRAWINGS

FIG. 3 is a schematic representation of the powertrain incorporating a family member of the present invention.

FIG. 5 is a schematic representation of the powertrain incorporating a family member of the present invention.

FIG. 9 is a schematic representation of the powertrain incorporating a family member of the present invention.

FIG. 17 is a schematic representation of the powertrain incorporating a family member of the present invention.

DESCRIPTION OF AN EXEMPLARY EMBODIMENT

Figures 1, 2:
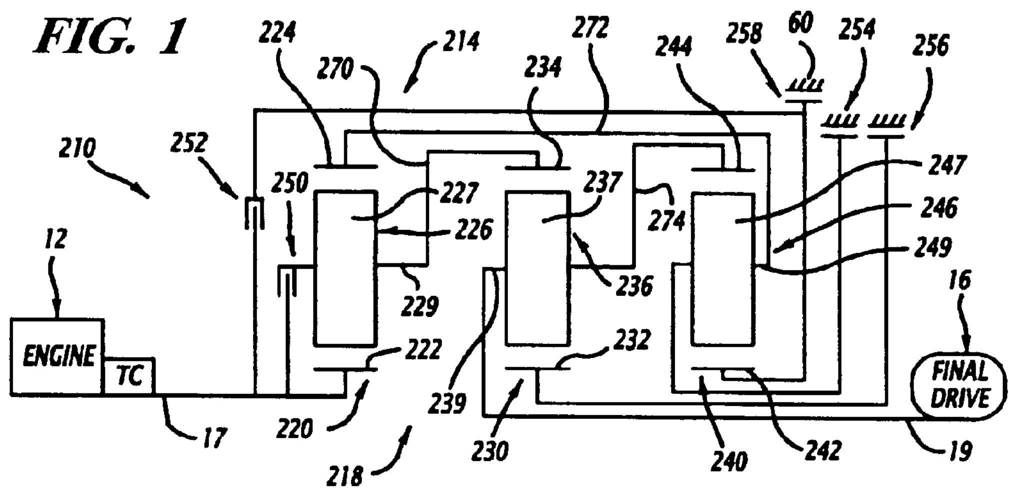
FIG. 1 is a schematic representation of the powertrain incorporating a family member of the present invention.
FIG. 2 is a truth table and chart describing some of the operating characteristics of the family member shown in FIG. 1.

Referring to the drawings, wherein like characters represent the same or corresponding parts throughout the several views, there is seen in FIG. 1 a powertrain 210 having a conventional engine and torque converter 12, a planetary transmission 214, and a final drive mechanism 16. The planetary transmission 214 includes an input shaft 17, a planetary gear arrangement 218, and an output shaft 19.

The planetary gear arrangement 218 includes a planetary gearset 220, a planetary gearset 230, and a planetary gearset 240, as well as five torque-transmitting mechanisms 250, 252, 254, 256 and 258. The torque-transmitting mechanisms 250 and 252 are of the rotating type torque-transmitting mechanisms, or clutches, and the torque-transmitting mechanisms 254, 256 and 258 are of stationary type torque-transmitting mechanisms, or brakes. The torque-transmitting mechanisms 254, 256 and 258 are connected with the transmission housing 60.

The planetary gearset 220 includes a sun gear member 222, a ring gear member 224, and a planet carrier assembly member 226. The planet carrier assembly member 226 includes a plurality of pinion gears 227 rotatably mounted on a planet carrier 229.

The planetary gearset 230 includes a sun gear member 232, a ring gear member 234, and a planet carrier assembly member 236 that includes a plurality of pinion gears 237 rotatably mounted on a planet carrier 239.

The planetary gearset 240 includes a sun gear member 242, a ring gear member 244, and a planet carrier assembly member 246. The planet carrier assembly member 246 includes a plurality of pinion gears 247 rotatably mounted on a planet carrier 249.

The planet carrier assembly member 226 is continuously connected with the ring gear member 234 through an interconnecting member 270. The ring gear member 224 and planet carrier assembly member 246 are continuously interconnected by an interconnecting member 272. The planet carrier assembly member 236, ring gear member 244, and output shaft 19 are continuously interconnected with an interconnecting member 274. The input shaft 17 is continuously connected with the sun gear member 222, selectively connectable with the planet carrier assembly member 226 through the torque-transmitting mechanism 250, and selectively connectable with the sun gear member 242 through the torque-transmitting mechanism 252. The planet carrier assembly member 246 and ring gear member 224 are selectively connectable to the transmission housing 60 through the torque-transmitting mechanism 254. The sun gear member 232 is selectively connectable with the transmission housing 60 through the torque-transmitting mechanism 256. The sun gear member 242 is selectively connectable with the transmission housing 60 through the torque-transmitting mechanism 258.

The truth table of FIG. 2 depicts the engagement sequence in combination for the torque-transmitting mechanisms to establish six forward speed ratios and one reverse speed ratio in the planetary gear arrangement 218. The torque-transmitting mechanism 254 is engaged in both first and reverse and therefore can be maintained engaged through the neutral condition to simplify the forward/reverse interchange.

To establish the reverse drive ratio, the torque-transmitting mechanisms 252 and 254 are engaged in combination. During the reverse operation, the sun gear member 242 will be driven in unison with the input shaft 17 and the planet carrier assembly member 246 will be held stationary. The ring gear member 244 and therefore output shaft 19 will be driven in reverse at a reduced ratio at a speed determined by the speed of the sun gear member 242 and the ring gear/sun gear tooth ratio of the planetary gearset 240. The numerical value of the reverse speed ratio is determined by the ring gear/sun gear tooth ratio of the planetary gearset 240.

The first forward speed ratio is established with the engagement of the torque-transmitting mechanisms 254 and 256. During the first forward speed ratio the ring gear member 224 and the sun gear member 232 are held stationary. The planet carrier assembly member 226 and ring gear member 234 are driven forwardly at a reduced speed determined by the speed of the sun gear member 222 and the ring gear/sun gear tooth ratio of the planetary gearset 220. The output shaft 19 and planet carrier assembly member 236 are driven forwardly at a reduced speed ratio determined by the speed of the ring gear member 234 and the ring gear/sun gear tooth ratio of the planetary gearset 230. The numerical value of the first forward speed ratio is determined by the ring gear/sun gear tooth ratios of the planetary gearsets 220 and 230.

The second forward speed ratio is established with the engagement of the torque-transmitting mechanisms 256 and 258. The sun gear member 232 and sun gear member 242 are held stationary. The sun gear member 222 is driven forwardly by the input shaft 17. The interconnecting members 270, 272, and 274 will all rotate forwardly at a reduced speed ratio, which will result in the forward rotation of the output shaft 19 at a reduced speed ratio. The numerical value of the second forward speed ratio is determined by the ring gear/sun gear tooth ratios of all three planetary gearsets 220, 230, and 240.

The third forward speed ratio is established with the engagement of the torque-transmitting mechanisms 252 and 256. During the third forward speed ratio, the sun gear member 232 is held stationary, and the sun gear member 242 is driven by the input shaft 17. Also during the third forward speed ratio, the interconnecting members 270, 272, and 274, all rotate forwardly at a reduced speed ratio, similar to the second ratio operation. Therefore, the output shaft 19 also rotates forwardly at a reduced speed value. The numerical value of the third forward speed ratio is determined by the ring gear/sun gear tooth ratios of all three planetary gearsets 220, 230, and 240.

The fourth forward speed ratio is established with the engagement of the torque-transmitting mechanisms 250 and 256. During the fourth forward speed ratio, the sun gear member 232 is held stationary and the planetary gearset 220 and ring gear member 234 are driven forwardly at a speed determined by the speed of the input shaft 17. The output shaft 19 and planet carrier assembly member 236 are driven forwardly at a speed determined by the speed of the ring gear member 234 and the ring gear/sun gear tooth ratio of the planetary gearset 230. The numerical value of the fourth forward speed ratio is determined by the ring gear/sun gear tooth ratio of the planetary gearset 230.

The fifth forward speed ratio is established with the engagement of the torque-transmitting mechanisms 250 and 252. The simultaneous engagement of these two torque-transmitting mechanisms results in the planetary gearsets 220, 230, and 240 all rotating in unison with the input shaft 17. Therefore, the input shaft 17 and output shaft 19 rotate in unison and the fifth forward speed ratio is a direct drive or a 1:1 ratio.

The sixth forward speed ratio is established with the engagement of the torque-transmitting mechanisms 250 and 258. During the sixth forward speed ratio, the planet carrier assembly member 246 is driven directly by the input shaft 17 and the sun gear member 242 is held stationary. The ring gear member 244 and therefore output shaft 19 are rotated forwardly at an increased speed ratio determined by the speed of the planet carrier assembly member 246 and the ring gear/sun gear tooth ratio of the planetary gearset 240. The numerical value of the sixth forward speed ratio is determined by the ring gear/sun gear tooth ratio of the planetary gearset 240.

The truth table of FIG. 2 makes it evident that each of the single step and double step forward interchange operations are of the single transition variety. The truth table also provides an example of numerical ratios that are available with the family member transmission illustrated in FIG. 1. These numerical values have been determined utilizing the sample ring gear/sun gear tooth ratios also given in FIG. 2. The R1/S1 value is the ring gear/sun gear tooth ratio of the planetary gearset 220; the R2/S2 value is the ring gear/sun gear tooth ratio of the planetary gearset 230; and the R3/S3 value is the ring gear/sun gear tooth ratio of the planetary gearset 240. Also described in FIG. 2 is an example of the ratio steps available between adjacent forward speed ratios and the reverse/first speed ratio. These numerical values have been determined utilizing the example tooth ratios that are given in FIG. 2.

A powertrain 310, shown in FIG. 3, includes the conventional engine and torque converter 12, a planetary transmission family member 314, and conventional final drive mechanism 16. The planetary transmission 314 includes input shaft 17, a planetary gear arrangement 318, and output shaft 19. The planetary gear arrangement 318 includes three planetary gearsets 320, 330, and 340 and five torque-transmitting mechanism 350, 352, 354, 356 and 358. The torque-transmitting mechanisms 350 and 352 are of the rotating type torque-transmitting mechanisms, or clutches, and the torque-transmitting mechanisms 354, 356 and 358 are of stationary type torque-transmitting mechanisms, or brakes. The torque-transmitting mechanisms 354, 356 and 358 are connected with the transmission housing 60.

The planetary gearset 320 includes a sun gear member 322, a ring gear member 324, and a planet carrier assembly member 326. The planet carrier assembly member 326 includes a plurality of pinion gears 327 rotatably mounted on a planet carrier 329.

The planetary gearset 330 includes a sun gear member 332, a ring gear member 334, and a planet carrier assembly member 336 that includes a plurality of pinion gears 337 rotatably mounted on a planet carrier 339.

The planetary gearset 340 includes a sun gear member 342, a ring gear member 344, and a planet carrier assembly member 346. The planet carrier assembly member 346 includes a plurality of pinion gears 347 rotatably mounted on a planet carrier 349.

Ring gear member 324 and planet carrier assembly member 336 are continuously interconnected with an interconnecting member 370 which is also connected with the output shaft 19. The planet carrier assembly member 326 and the ring gear member 344 are continuously interconnected by an interconnecting member 372 and selectively connectable with the transmission housing 60 through the torque-transmitting mechanism 354. The ring gear member 334 and planet carrier assembly member 346 are continuously interconnected by an interconnecting member 374, and selectively connectable with the input shaft 17 through the torque-transmitting mechanism 352. The input shaft 17 is continuously connected with the sun gear member 342 and selectively connectable with the sun gear member 322 through the torque-transmitting mechanism 350. The sun gear member 332 is selectively connectable with the transmission housing 60 through the torque-transmitting mechanism 358. The sun gear member 322 is selectively connectable with the transmission housing 60 through the torque-transmitting mechanism 356.

Figure 4:
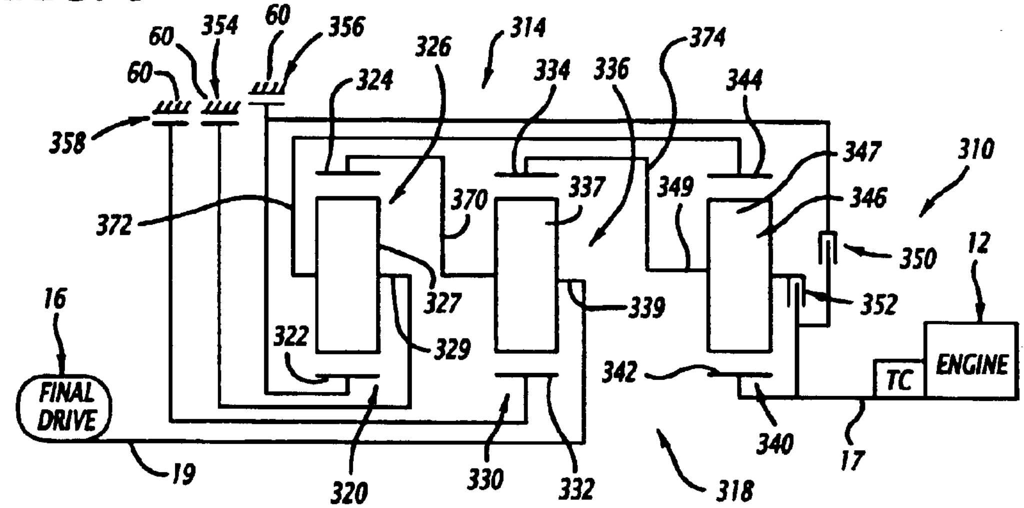
FIG. 4 is a truth table and chart describing some of the operating characteristics of the family member shown in FIG. 3.

The truth table, shown in FIG. 4, defines the combinations of torque-transmitting mechanism engagements and the sequence required to establish the reverse speed ratio and the six forward speed ratios. It should be noted that the torque-transmitting mechanism 354 can remain engaged through a neutral condition to simplify the forward/reverse interchange. Those skilled in the art will recognize that the reverse speed ratio is determined by the ring gear/sun gear tooth ratio of the planetary gearset 320.

The first forward speed ratio has a numerical value determined by the ring gear/sun gear tooth ratios of the planetary gearsets 330 and 340. The second and third forward speed ratios have numerical values determined by the ring gear/sun gear tooth ratios of all three planetary gearsets 320, 330 and 340. The fourth forward speed ratio has a numerical value determined by the ring gear/sun gear tooth ratio of the planetary gearset 330. The fifth forward speed ratio is a direct drive or 1:1 ratio. The sixth forward speed ratio is an overdrive ratio having a numerical value determined by the ring gear/sun gear tooth ratio of the planetary gearset 320.

The truth table of FIG. 4 also provides a set of possible ratio values that can be utilized with the family member described in FIG. 3. These numerical values have been established utilizing the ring gear/sun gear tooth ratios also given in FIG. 4. The R1/S1 value is the ring gear/sun gear tooth ratio of the planetary gearset 320; the R2/S2 value is the ring gear/sun gear tooth ratio of the planetary gearset 330; and the R3/S3 value is the ring gear/sun gear tooth ratio of the planetary gearset 340.

The chart of FIG. 4 provides an example of the ratio steps and overall ratio spread that can be attained with the family member described above utilizing the sample tooth ratios given in FIG. 4. The chart provides the reverse/first step as well as the step ratio between adjacent forward speed ratios. The truth table makes it evident that each of the single step forward ratio interchanges is a single transition shift, and each of the double step forward speed ratio interchanges is a single transition shift.

A powertrain 410, shown in FIG. 5, includes the engine and torque converter 12, a planetary transmission 414, and conventional final drive mechanism 16. The planetary transmission 414 includes input shaft 17, a planetary gear arrangement 418, and output shaft 19. The planetary gear arrangement 418 includes three planetary gearsets 420, 430, and 440 and five torque-transmitting mechanism 450, 452, 454, 456 and 458. The torque-transmitting mechanisms 450 and 452 are of the rotating type torque-transmitting mechanisms, or clutches, and the torque-transmitting mechanisms 454, 456 and 458 are of stationary type torque-transmitting mechanisms, or brakes. The torque-transmitting mechanisms 454, 456 and 458 are connected with the transmission housing 60.

The planetary gearset 420 includes a sun gear member 422, a ring gear member 424, and a planet carrier assembly member 426. The planet carrier assembly member 426 includes a plurality of pinion gears 427 rotatably mounted on a planet carrier 429.

The planetary gearset 430 includes a sun gear member 432, a ring gear member 434, and a planet carrier assembly member 436 that includes a plurality of pinion gears 437 rotatably mounted on a planet carrier 439.

The planetary gearset 440 includes a sun gear member 442, a ring gear member 444, and a planet carrier assembly member 446. The planet carrier assembly member 446 includes a plurality of pinion gears 447 rotatably mounted on a planet carrier 449.

The ring gear member 424 and planet carrier assembly member 436 are continuously interconnected by an interconnecting member 470. The planet carrier assembly member 426 and the planet carrier assembly member 446 are continuously interconnected for by an interconnecting member 472. The sun gear member 442 and ring gear member 434 are continuously interconnected by an interconnecting member 474.

The input shaft 17 is continuously connected with the sun gear member 432 and selectively connectable with the interconnecting member 470 through the torque-transmitting mechanism 450, and with the interconnecting member 472 through the torque-transmitting mechanism 452. The output shaft 19 is continuously connected with the ring gear member 444. The sun gear member 422 is selectively connectable with the transmission housing 60 through the torque-transmitting mechanism 456. The interconnecting member 472 is selectively connectable with the transmission housing 60 through the torque-transmitting mechanism 454. The interconnecting member 474 is selectively connectable with the transmission housing 60 through the torque-transmitting mechanism 458.

Figure 6:
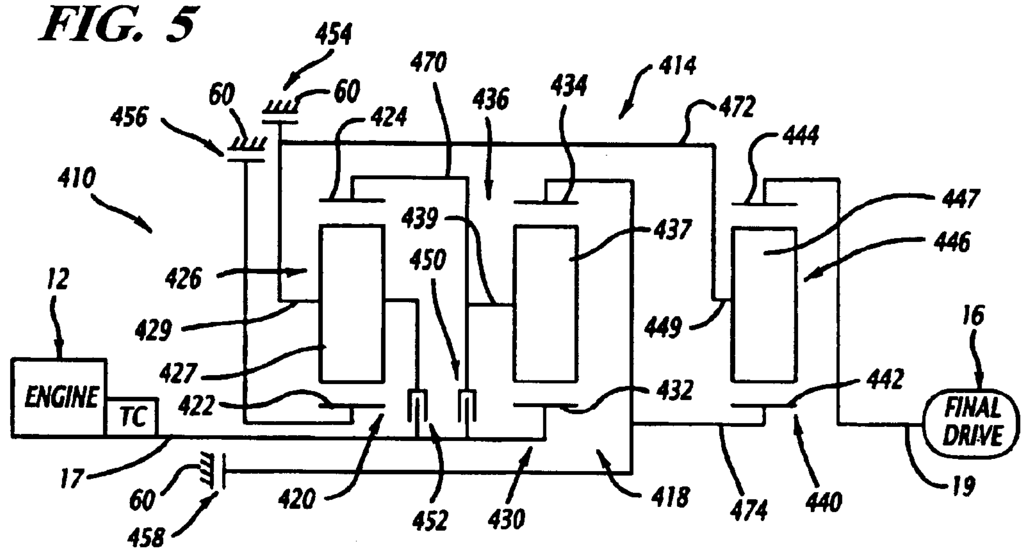
FIG. 6 is a truth table and chart describing some of the operating characteristics of the family member shown in FIG. 5.

The truth table, shown in FIG. 6, defines the engagement combinations for the torque-transmitting mechanisms to establish a reverse ratio and six forward speed ratios within the planetary transmission 414. The truth table also defines the sequence of operation for ratio interchanges in the forward direction. Those skilled in the art, upon reviewing the truth table, and the schematic representation, will be aware that the numerical value of the reverse speed ratio is determined by the ring gear/sun gear tooth ratio of the planetary gearset 440.

The numerical value of the first forward speed ratio is determined by the ring gear/sun gear tooth ratios of the planetary gearsets 430 and 440. The numerical value of the second forward speed ratio is determined by the ring gear/sun gear tooth ratios of all three planetary gearsets 420, 430, and 440. The numerical value of the third forward speed ratio is determined by the ring gear/sun gear tooth ratios of the planetary gearsets 420 and 440. The numerical value of the fourth forward speed ratio is determined by the ring gear/sun gear tooth ratios of all three planetary gearsets 420, 430, and 440. The numerical value of the fifth forward speed ratio is one, that is, the fifth ratio is a direct drive. The numerical value of the sixth forward speed ratio is determined by the ring gear/sun gear tooth ratio of the planetary gearset 440. The sixth forward speed ratio is an overdrive ratio, while the first through fourth forward speed ratios are underdrive ratios.

The truth table of FIG. 6 provides an example of numerical values of ratios that are available with the planetary gear arrangement 418. These speed ratios and numerical ratios were arrived at utilizing the ring gear/sun gear tooth ratios given in FIG. 6. The R1/S1 value is the ring gear/sun gear tooth ratio of the planetary gearset 420; the R2/S2 value is the ring gear/sun gear tooth ratio of the planetary gearset 430; and the R3/S3 value is the ring gear/sun gear tooth ratio of the planetary gearset 440.

The chart of FIG. 6 describes the ratio steps between adjacent forward speed ratios as well as the ratio step between reverse and forward. The overall ratio spread of first to sixth is also given in the chart of FIG. 6.

Figures 7, 8:
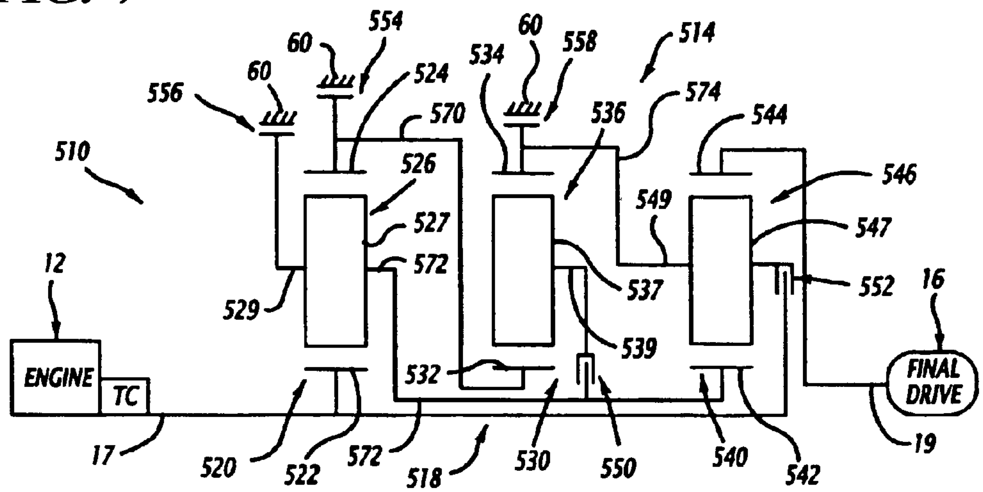
FIG. 7 is a schematic representation of the powertrain incorporating a family member of the present invention.
FIG. 8 is a truth table and chart describing some of the operating characteristics of the family member shown in FIG. 7.

A powertrain 510, shown in FIG. 7, includes the conventional engine and torque converter 12, a planetary transmission 514, and the conventional final drive mechanism 16. The planetary gear arrangement 514 includes the input shaft 17, a planetary gear arrangement 518, and output shaft 19. The planetary gear arrangement 518 includes three planetary gearsets 520, 530, and 540 and five torque-transmitting mechanism 550, 552, 554, 556 and 558. The torque-transmitting mechanisms 550 and 552 are of the rotating type torque-transmitting mechanisms, or clutches, and the torque-transmitting mechanisms 554, 556 and 558 are of stationary type torque-transmitting mechanisms, or brakes. The torque-transmitting mechanisms 554, 556 and 558 are connected with the transmission housing 60.

The planetary gearset 520 includes a sun gear member 522, a ring gear member 524, and a planet carrier assembly member 526. The planet carrier assembly member 526 includes a plurality of pinion gears 527 rotatably mounted on a planet carrier 529.

The planetary gearset 530 includes a sun gear member 532, a ring gear member 534, and a planet carrier assembly member 536 that includes a plurality of pinion gears 537 rotatably mounted on a planet carrier 539.

The planetary gearset 540 includes a sun gear member 542, a ring gear member 544, and a planet carrier assembly member 546. The planet carrier assembly member 546 includes a plurality of pinion gears 547 rotatably mounted on a planet carrier 549.

The ring gear member 524 and the sun gear member 532 are continuously interconnected by an interconnecting member 570. The planet carrier assembly member 526 and the sun gear member 542 are continuously interconnected by an interconnecting member 572. The ring gear member 534 and the planet carrier assembly member 546 are continuously interconnected by an interconnecting member 574.

The input shaft 17 is continuously connected with the sun gear member 522 and selectively connectable with the interconnecting member 574 through the torque-transmitting mechanism 552. The output shaft 19 is continuously connected with the ring gear member 544. The planet carrier assembly member 536 is selectively connectable with the interconnecting member 572 through the torque-transmitting mechanism 550. The interconnecting member 570 is selectively connectable with the transmission housing 60 through the torque-transmitting mechanism 554. The interconnecting member 572 is selectively connectable with the transmission housing 60 through the torque-transmitting mechanism 556. The interconnecting member 574 is selectively connectable with the transmission housing 60 through the torque-transmitting mechanism 558.

The truth table, shown in FIG. 8, describes the combinations of torque-transmitting mechanism engagement as well as the interchange sequence to establish the first through sixth forward speed ratios. It should be noted that the torque-transmitting mechanism 558 can remain engaged through a neutral condition thereby simplifying the forward/reverse interchange. Those skilled in the art will recognize that the numerical value of the reverse speed ratio is determined by the ring gear/sun gear tooth ratios of the planetary gearsets 520 and 540.

The numerical value of the first, second, and third forward speed ratios are each determined by the ring gear/sun gear tooth ratios of all three planetary gearsets 520, 530, and 540. The fourth forward speed ratio is a direct drive or a 1:1 ratio. The numerical value of the fifth forward speed ratio is determined by the ring gear/sun gear tooth ratios of the planetary gearsets 520 and 540. The numerical value of the sixth forward speed ratio is determined by the ring gear/sun gear tooth ratio of the planetary gearset 540. The forward speed ratios first through third are each underdrive speed ratios, and the fifth and sixth speed ratios are overdrive speed ratios.

The truth table also provides an example of numerical values that are available with the planetary gear arrangement 518. The numerical ratios are determined utilizing the ring gear/sun gear tooth ratio relationships given in FIG. 8. The R1/S1 value is the ring gear/sun gear tooth ratio of the planetary gearset 520; the R2/S2 value is the ring gear/sun gear tooth ratio is the ring gear/sun gear tooth ratio of the planetary gearset 530; and the R3/S3 value is the ring gear/sun gear tooth ratio of the planetary gearset 540.

Also depicted in FIG. 8, is a chart describing the ratio steps between adjacent forward speed ratios as well as the reverse-to-forward ratio step. The overall ratio spread of the forward speed ratios is also given in the chart. Those skilled in the art will recognize that each of the single step forward interchanges is a single transition interchange, and each of the double step forward interchanges is also a single transition change.

A powertrain 610, shown in FIG. 9, includes the conventional engine and torque converter 12, a planetary transmission 614, and the conventional final drive mechanism 16. The planetary transmission 614 includes input shaft 17, a planetary gear arrangement 618, and output shaft 19. The planetary gear arrangement 618 includes three planetary gearsets 620, 630, and 640 and five torque-transmitting mechanism 650, 652, 654, 656 and 658. The torque-transmitting mechanisms 650 and 652 are of the rotating type torque-transmitting mechanisms, or clutches, and the torque-transmitting mechanisms 654, 656 and 658 are of stationary type torque-transmitting mechanisms, or brakes. The torque-transmitting mechanisms 654, 656 and 658 are connected with the transmission housing 60.

The planetary gearset 620 includes a sun gear member 622, a ring gear member 624, and a planet carrier assembly member 626. The planet carrier assembly member 626 includes a plurality of pinion gears 627 rotatably mounted on a planet carrier 629.

The planetary gearset 630 includes a sun gear member 632, a ring gear member 634, and a planet carrier assembly member 636 that includes a plurality of pinion gears 637 rotatably mounted on a planet carrier 639.

The planetary gearset 640 includes a sun gear member 642, a ring gear member 644, and a planet carrier assembly member 646. The planet carrier assembly member 646 includes a plurality of pinion gears 647 rotatably mounted on a planet carrier 649.

The sun gear member 622 and the planet carrier assembly member 636 are continuously interconnected by an interconnecting member 670. The planet carrier assembly member 626 and the planet carrier assembly member 646 are continuously interconnected by an interconnecting member 672. The sun gear members 632 and 642 are continuously interconnected by an interconnecting member 674. The input shaft 17 is continuously interconnected with the interconnecting member 674 and selectively interconnectable with the interconnecting member 672 through the torque transmitting mechanism 652. The output shaft 19 is continuously interconnected with the ring gear member 624. The ring gear member 644 is selectively connectable with the interconnecting member 670 through the torque transmitting mechanism 650. The interconnecting member 672 is selectively interconnectable with the housing 60 through the torque transmitting mechanism 656. The interconnecting member 670 is selectively interconnectable with the housing 60 through the torque transmitting mechanism 654. The ring gear member 634 is selectively interconnectable with the housing 60 through the torque transmitting mechanism 658.

Figure 10:
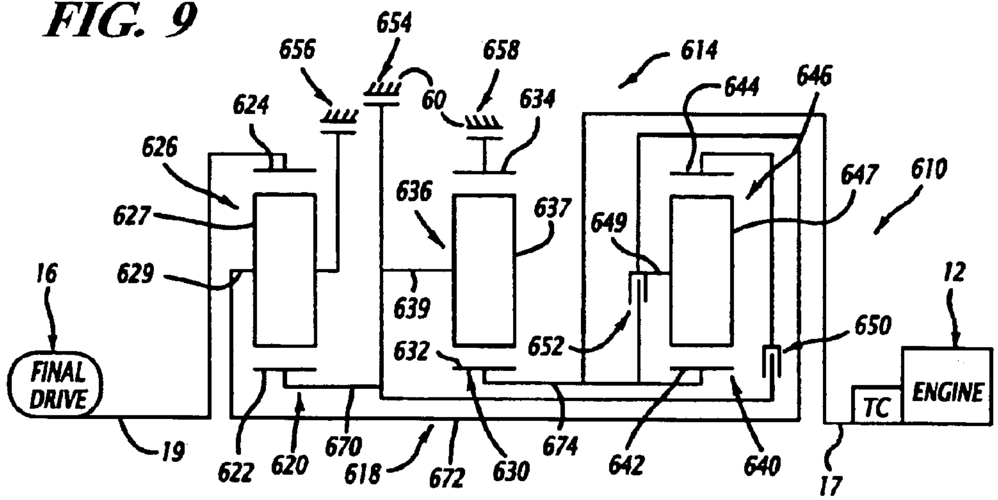
FIG. 10 is a truth table and chart describing some of the operating characteristics of the family member shown in FIG. 9.

The truth table, shown in FIG. 10, describes the combinations of torque-transmitting mechanism engagements to provide a reverse speed and six forward speed ratios. That truth table also defines the engagement schedule, which permits the ratio interchanges from first through sixth in the forward direction. It should be noted from the truth table that each of the single step forward speed ratios is a single transition interchange, and each of the double step forward interchanges is also a single transition interchange.

The truth table also provides an example of the numerical values of the speed ratios that are available with the planetary gear arrangement 618. These numerical values are determined utilizing the ring gear/sun gear tooth ratios also given in FIG. 10 by way of example. The R1/S1 value is the ring gear/sun gear tooth ratio of the planetary gearset 620; R2/S2 value is the ring gear/sun gear tooth ratio of the planetary gearset 630; and the R3/S3 value is the ring gear/sun gear tooth ratio of the planetary gearset 640. Those skilled in the art will recognize that the numerical value of the reverse speed ratio is determined by the ring gear/sun gear tooth ratios of the planetary gearsets 620 and 630.

The numerical values of the first and second forward speed ratios are determined utilizing the ring gear/sun gear tooth ratios of the planetary gearsets 620 and 640. The numerical value of the third forward speed ratio is determined utilizing the ring gear/sun gear tooth ratios of all three planetary gearsets 620, 630, and 640. The fourth forward speed ratio is a direct drive having a numerical value of one. The fifth forward speed ratio is an overdrive ratio having a numerical value determined utilizing the ring gear/sun gear tooth ratios of the planetary gearsets 620 and 630. The sixth forward speed ratio is an overdrive ratio having a numerical value determined utilizing the ring gear/sun gear tooth ratio of the planetary gearset 620.

The chart of FIG. 10 describes the ratio steps between the adjacent forward speed ratios and also the step between the reverse and forward speed ratios. The chart further provides the ratio spread value for the forward speed ratios.

Figures 11, 12:
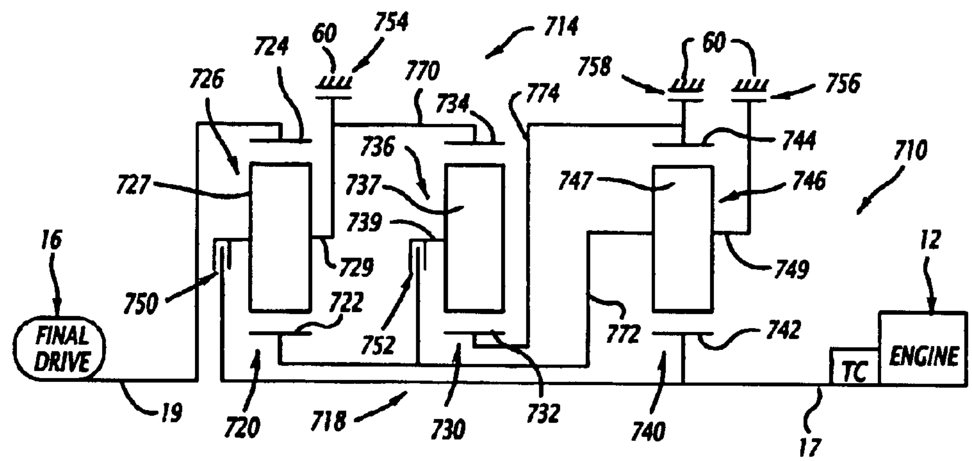
FIG. 11 is a schematic representation of the powertrain incorporating a family member of the present invention.
FIG. 12 is a truth table and chart describing some of the operating characteristics of the family member shown in FIG. 11.

A powertrain 710, shown in FIG. 11, includes the engine and torque converter 12, a planetary transmission 714, and the final drive mechanism 16. The planetary transmission 714 includes the input shaft 17, a planetary gear arrangement 718, and the output shaft 19. The planetary gear arrangement 718 includes three planetary gearsets 720, 730, and 740 and five torque-transmitting mechanism 750, 752, 754, 756 and 758. The torque-transmitting mechanisms 750 and 752 are of the rotating type torque-transmitting mechanisms, or clutches, and the torque-transmitting mechanisms 754, 756 and 758 are of stationary type torque-transmitting mechanisms, or brakes. The torque-transmitting mechanisms 754, 756 and 758 are connected with the transmission housing 60.

The planetary gearset 720 includes a sun gear member 722, a ring gear member 724, and a planet carrier assembly member 726. The planet carrier assembly member 726 includes a plurality of pinion gears 727 rotatably mounted on a planet carrier 729.

The planetary gearset 730 includes a sun gear member 732, a ring gear member 734, and a planet carrier assembly member 736 that includes a plurality of pinion gears 737 rotatably mounted on a planet carrier 739.

The planetary gearset 740 includes a sun gear member 742, a ring gear member 744, and a planet carrier assembly member 746. The planet carrier assembly member 746 includes a plurality of pinion gears 747 rotatably mounted on a planet carrier 749.

The planet carrier assembly member 726 and the ring gear member 734 are continuously interconnected by an interconnecting member 770. The sun gear member 722 and planet carrier assembly member 746 are continuously interconnected by an interconnecting member 772. The sun gear member 732 and the ring gear member 744 are continuously interconnected by an interconnecting member 774.

The input shaft 17 is continuously connected with the sun gear member 742 and selectively connectable with the interconnecting member 770 through the torque-transmitting mechanism 750. The output shaft 19 is continuously interconnected with the ring gear member 724. The interconnecting member 772 is selectively connectable with the planet carrier assembly member 736 through the torque-transmitting mechanism 752, and with the transmission housing 60 through the torque-transmitting mechanism 756. The interconnecting member 770 is selectively connectable with the transmission housing 60 through the torque-transmitting mechanism 754. The interconnecting member 774 is selectively connectable with the transmission housing 60 through the torque-transmitting mechanism 758.

As seen in the truth table of FIG. 12, the engagement of the torque-transmitting mechanisms in combinations of two will provide the reverse drive ratio and six forward speed ratios. The truth table also defines the interchange sequence utilized to provide single step ratio interchanges in the forward direction. It should be noted that each of the single step forward interchanges is a single transition interchange, as well as each of the double step forward interchanges is a single transition interchange.

The truth table also provides an example of numerical values for the ratios that can be attained with the planetary gear arrangement 718. These numerical values are determined utilizing the ring gear/sun gear tooth ratios given in FIG. 12. The R1/S1 value is the ring gear/sun gear tooth ratio of the planetary gearset 720; the R2/S2 value is the ring gear/sun gear tooth ratio of the planetary gearset 730; and the R3/S3 value is the ring gear/sun gear tooth ratio of the planetary gearset 740. Those skilled in the art will be aware that the numerical value for the reverse speed ratio is determined utilizing the tooth values of the planetary gearsets 720 and 740.

The numerical values for the first, second and third forward speed ratios are determined utilizing the ring gear/sun gear tooth ratios of all three planetary gearsets 720, 730, and 740. The fourth forward speed ratio is a direct drive or 1:1 ratio. The fifth forward speed ratio is an overdrive ratio having a numerical value determined utilizing the ring gear/sun gear tooth ratios of the planetary gearsets 720 and 740. The sixth forward speed ratio is also an overdrive ratio having a numerical value determined utilizing the ring gear/sun gear tooth ratio of the planetary gearset 720. The first three forward speed ratios are all underdrive ratios.

The chart shown in FIG. 12 provides an example of ratio steps between the adjacent forward speed ratios and between the reverse and first forward speed ratio which can be attained utilizing the given tooth ratios. The chart also provides an overall ratio spread for the forward speed ratios.

Figures 13, 14:
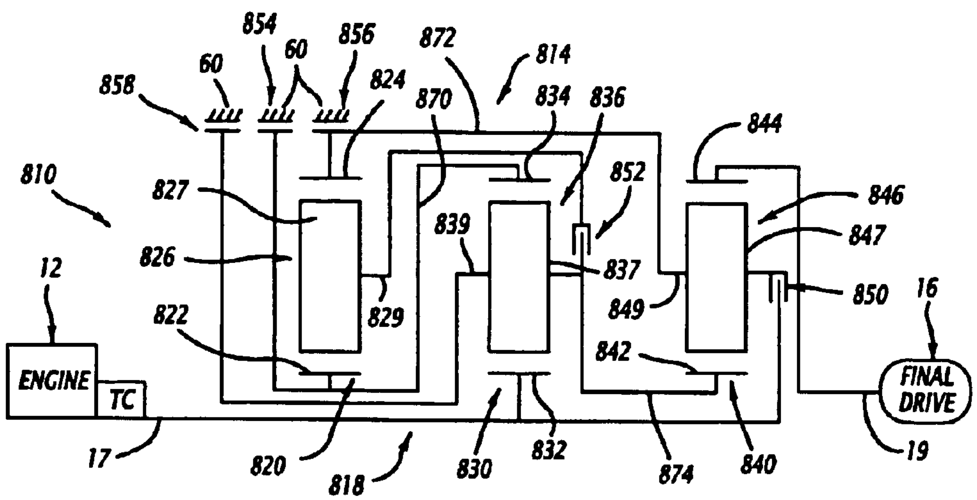
FIG. 13 is a schematic representation of the powertrain incorporating a family member of the present invention.
FIG. 14 is a truth table and chart describing some of the operating characteristics of the family member shown in FIG. 13.

A powertrain 810, shown in FIG. 13, includes the conventional engine and torque converter 12, a planetary transmission 814, and the final drive mechanism 16. The planetary transmission 814 includes the input shaft 17, a planetary gear arrangement 818, and the output shaft 19. The planetary gear arrangement 818 includes three planetary gearsets 820, 830, and 840 and five torque-transmitting mechanism 850, 852, 854, 856 and 858. The torque-transmitting mechanisms 850 and 852 are of the rotating type torque-transmitting mechanisms, or clutches, and the torque-transmitting mechanisms 854, 856 and 858 are of stationary type torque-transmitting mechanisms, or brakes. The torque-transmitting mechanisms 854, 856 and 858 are connected with the transmission housing 60.

The planetary gearset 820 includes a sun gear member 822, a ring gear member 824, and a planet carrier assembly member 826. The planet carrier assembly member 826 includes a plurality of pinion gears 827 rotatably mounted on a planet carrier 829.

The planetary gearset 830 includes a sun gear member 832, a ring gear member 834, and a planet carrier assembly member 836 that includes a plurality of pinion gears 837 rotatably mounted on a planet carrier 839.

The planetary gearset 840 includes a sun gear member 842, a ring gear member 844, and a planet carrier assembly member 846. The planet carrier assembly member 846 includes a plurality of pinion gears 847 rotatably mounted on a planet carrier 849.

The sun gear member 822 is continuously connected with the ring gear member 834 through an interconnecting member 870. The ring gear member 824 and the planet carrier assembly member 846 are continuously interconnected by an interconnecting member 872. The planet carrier assembly member 836 and the sun gear member 842 are continuously interconnected by an interconnecting member 874.

The input shaft 17 is continuously connected with the sun gear member 832 and selectively connectable with the interconnecting member 872 through the torque-transmitting mechanism 850. The ring gear member 844 is continuously interconnected with the output shaft 19. The interconnecting member 874 is selectively interconnectable with the planet carrier assembly member 826 through the torque-transmitting mechanism 852. The interconnecting member 870 is selectively connectable with the transmission housing 60 through the torque-transmitting mechanism 854. The interconnecting member 872 is selectively connectable with the transmission housing 60 through the torque-transmitting mechanism 856. The planet carrier assembly member 836 is selectively connectable with the transmission housing 60 through the torque-transmitting mechanism 858.

The truth table in FIG. 14 describes the combinations of torque-transmitting mechanism engagements which will provide a reverse speed ratio and six forward speed ratios in the planetary gear arrangement 818 between the input shaft 17 and the output shaft 19. The truth table also provides a numerical example of the speed ratios that are available with the planetary gear arrangement 818. These numerical values have been determined utilizing the ring gear/sun gear tooth ratios given in FIG. 14. The R1/S1 value is the ring gear/sun gear tooth ratio of the planetary gearset 820; the R2/S2 value is the ring gear/sun gear tooth ratio of the planetary gearset 830; and the R3/S3 value is the ring gear/sun gear tooth ratio of the planetary gearset 840.

The numerical value for the reverse speed ratio is determined utilizing the ring gear/sun gear tooth ratios of the planetary gearsets 830 and 840. The numerical values of the first three forward speed ratios, which are underdrive ratios, are determined utilizing the ring gear/sun gear tooth ratios of all three planetary gearsets 820, 830, and 840. The fourth forward speed ratio is a direct drive or a 1:1 ratio. The numerical value of the fifth forward speed ratio, which is an overdrive ratio, is determined utilizing the ring gear/sun gear tooth ratios of the planetary gearsets 830 and 840. The numerical value of the sixth forward speed ratio, which is an overdrive ratio, is determined utilizing the ring gear/sun gear tooth ratio of the planetary gearset 840.

The chart of FIG. 14 describes an example of the ratio steps of adjacent forward speed ratios and the reverse-to first speed ratio which is attained utilizing the numerical values of the ring gear/sun gear tooth ratios given. The chart of FIG. 14 also provides the overall ratio spread of the forward speed ratios. It is readily recognized from the truth table of FIG. 14 that each of the forward interchanges is a single transition interchange, and each of the double step interchanges in the forward direction is also a single transition interchange.

Figures 15, 16:
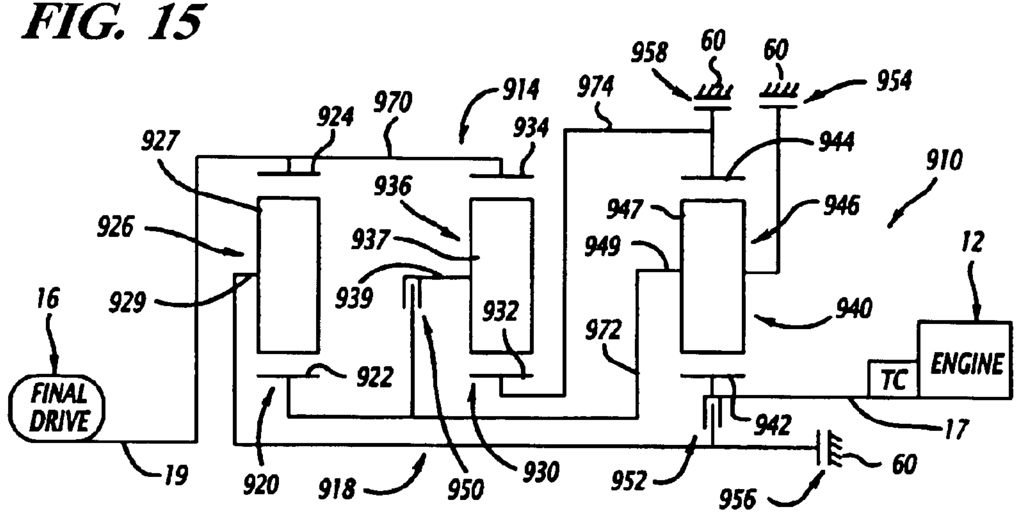
FIG. 15 is a schematic representation of the powertrain incorporating a family member of the present invention.
FIG. 16 is a truth table and chart describing some of the operating characteristics of the family member shown in FIG. 15.

A powertrain 910, shown FIG. 15, includes the conventional engine and torque converter 12, a planetary transmission 914, and the conventional final drive mechanism 16. The planetary transmission 914 includes the input shaft 17, a planetary gear arrangement 918, and the output shaft 19. The planetary gear arrangement 918 includes three planetary gearsets 920, 930, and 940 and five torque-transmitting mechanism 950, 952, 954, 956 and 958. The torque-transmitting mechanisms 950 and 952 are of the rotating type torque-transmitting mechanisms, or clutches, and the torque-transmitting mechanisms 954, 956 and 958 are of stationary type torque-transmitting mechanisms, or brakes. The torque-transmitting mechanisms 954, 956 and 958 are connected with the transmission housing 60.

The planetary gearset 920 includes a sun gear member 922, a ring gear member 924, and a planet carrier assembly member 926. The planet carrier assembly member 926 includes a plurality of pinion gears 927 rotatably mounted on a planet carrier 929.

The planetary gearset 930 includes a sun gear member 932, a ring gear member 934, and a planet carrier assembly member 936 that includes a plurality of pinion gears 937 rotatably mounted on a planet carrier 939.

The planetary gearset 940 includes a sun gear member 942, a ring gear member 944, and a planet carrier assembly member 946. The planet carrier assembly member 946 includes a plurality of pinion gears 947 rotatably mounted on a planet carrier 949.

The ring gear member 924 and ring gear member 934 are continuously interconnected by an interconnecting member 970, which is also connected with the output shaft 19. The sun gear member 922 and planet carrier assembly member 946 are continuously interconnected by an interconnecting member 972. The sun gear member 932 and the ring gear member 944 are continuously interconnected by an interconnecting member 974.

The input shaft 17 is continuously interconnected with the sun gear member 942 and selectively connectable with the planet carrier assembly member 926 through the torque-transmitting mechanism 952. The interconnecting member 972 is selectively connectable with the planet carrier assembly member 936 through the torque-transmitting mechanism 950. The interconnecting member 972 is selectively connectable with the transmission housing 60 through the torque-transmitting mechanism 954. The interconnecting member 974 is selectively connectable with the transmission housing 60 through the torque-transmitting mechanism 958.

The truth table in FIG. 16 describes the combinations of engagement of the torque-transmitting mechanisms that will provide a reverse speed ratio and six forward speed ratios in the planetary gear arrangement 918 between the input shaft 17 and the output shaft 19. The truth table also provides an example of numerical values for these ratios. These numerical values have been determined utilizing the ring gear/sun gear tooth ratios also given in FIG. 16. The R1/S1 value is the ring gear/sun gear tooth ratio of the planetary gearset 920; the R2/S2 value the ring gear/sun gear tooth ratio of the planetary gearset 930; and the R3/S3 value is the ring gear/sun gear tooth ratio of the planetary gearset 940. Those skilled in the art will recognize that the numerical value for the reverse ratio is determined by the ring gear/sun gear tooth ratios of planetary gearsets 920 and 940.

The numerical value for the first forward speed ratio is determined utilizing the ring gear/sun gear tooth ratios of all three planetary gearsets 920, 930, and 940. The numerical values for the second and third forward speed ratios is determined utilizing the ring gear/sun gear tooth ratios of the planetary gearsets 930 and 940. The fourth forward speed ratio is a direct drive or 1:1 ratio. The fifth forward speed ratio is an overdrive ratio having a numerical value determined utilizing the ring gear/sun gear tooth ratios of the planetary gearsets 920 and 940. The sixth forward speed ratio is an overdrive ratio having a numerical value determined utilizing the ring gear/sun gear tooth ratio of the planetary gearset 920.

The chart of FIG. 16 provides an example of the step ratios that are available between adjacent forward speed ratios and the step ratio available between the reverse and first speed ratio. The overall ratio spread of the forward speed ratios is also given in the chart. It is readily recognized on the truth table of FIG. 16 that the torque-transmitting mechanism 956 can remain engaged through the neutral condition thereby simplifying the forward/reverse interchange. Also recognizable from the truth table is the fact that each of the single step forward ratio interchanges are single transition interchanges and the double step forward ratio interchanges are single transition interchanges.

A powertrain 1010, shown in FIG. 17, includes the conventional engine and torque converter 12, a planetary transmission 1014, and the conventional final drive mechanism 16. The planetary transmission 1014 includes the input shaft 17, a planetary gear arrangement 1018, and the output shaft 19. The planetary gear arrangement 1018 includes three planetary gearsets 1020, 1030, and 1040 and five torque-transmitting mechanism 1050, 1052, 1054, 1056 and 1058. The torque-transmitting mechanisms 1050 and 1052 are of the rotating type torque-transmitting mechanisms, or clutches, and the torque-transmitting mechanisms 1054, 1056 and 1058 are of stationary type torque-transmitting mechanisms, or brakes. The torque-transmitting mechanisms 1054, 1056 and 1058 are connected with the transmission housing 60.

The planetary gearset 1020 includes a sun gear member 1022, a ring gear member 1024, and a planet carrier assembly member 1026. The planet carrier assembly member 1026 includes a plurality of pinion gears 1027 rotatably mounted on a planet carrier 1029.

The planetary gearset 1030 includes a sun gear member 1032, a ring gear member 1034, and a planet carrier assembly member 1036 that includes a plurality of pinion gears 1037 rotatably mounted on a planet carrier 1039.

The planetary gearset 1040 includes a sun gear member 1042, a ring gear member 1044, and a planet carrier assembly member 1046. The planet carrier assembly member 1046 includes a plurality of pinion gears 1047 rotatably mounted on a planet carrier 1049.

The planet carrier assembly member 1026 is continuously interconnected with the ring gear member 1034 through an interconnecting member 1070. The ring gear member 1024 is continuously interconnected with the ring gear member 1044 and the output shaft 19 through an interconnecting member 1072. The planet carrier assembly members 1036 and 1046 are continuously interconnected with an interconnecting member 1074, which is also connected with the input shaft 17.

The input shaft 17 is selectively interconnectable with the sun gear member 1022 through the interconnecting member 1074 and the torque transmitting mechanism 1050. The sun gear member 1042 is selectively interconnectable with the sun gear member 1032 through the torque-transmitting mechanism 1052. The sun gear member 1032 is selectively interconnectable with the transmission housing 60 through the torque-transmitting mechanism 1058. The sun gear member 1022 is selectively interconnectable with the transmission housing 60 through the torque-transmitting mechanism 1056. The interconnecting member 1070 is selectively interconnectable with the transmission housing 60 through the torque-transmitting mechanism 1054.

Figure 18:
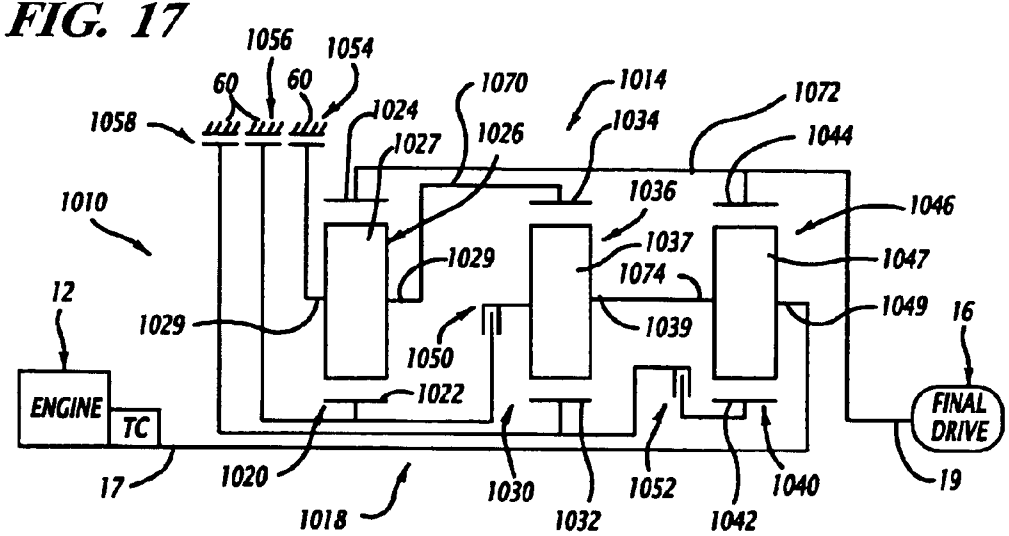
FIG. 18 is a truth table and chart describing some of the operating characteristics of the family member shown in FIG. 17.

The truth table, shown in FIG. 18, provides the definition of the combinations of engagements of the torque-transmitting mechanisms, which will provide a reverse speed ratio and six forward speed ratios. The truth table also defines the sequence of torque-transmitting mechanism interchanges which will permit the single transition step interchanges in the forward direction between the adjacent six forward speeds. It is also evident that the double step interchanges in the forward direction are also single transition ratio interchanges.

The truth table also provides an example of numerical values for the reverse ratio and the six forward speed ratios. The numerical values are determined utilizing the ring gear/sun gear tooth ratios, which are provided by way of example in FIG. 18. The R1/S1 value is the ring gear/sun gear tooth ratio for the planetary gearset 1020; the R2/S2 value is the ring gear/sun gear tooth ratio for the planetary gearset 1030; and the R3/S3 value is the ring gear/sun gear tooth ratio for the planetary gearset 1040. Those skilled in the art will recognize that the numerical value of the reverse speed ratio is determined utilizing the ring gear/sun gear tooth ratio of the planetary gearset 1020.

The first forward speed ratio has a numerical value determined utilizing the ring gear/sun gear tooth ratios of the planetary gearsets 1030 and 1040. The second forward speed ratio has a numerical value determined utilizing the ring gear/sun gear tooth ratios of all three planetary gearsets 1020, 1030, and 1040. The third forward speed ratio is a direct drive or 1:1 ratio. The fourth forward speed ratio has a numerical value determined utilizing the ring gear/sun gear tooth ratio of the planetary gearset 1040. The fifth and sixth forward speed ratios have numerical values determined utilizing the ring gear/sun gear tooth ratios of the planetary gearsets 1020 and 1030. The first and second forward speed ratios are underdrive ratios and the fourth through sixth forward speed ratios are overdrive ratios.

Also depicted in FIG. 18 is a chart, which describes the ratio steps between adjacent forward speed ratios as well as between the reverse and first forward speed ratio. The overall ratio spread of the forward speed ratios is also given in the chart.

Figures 19, 20:
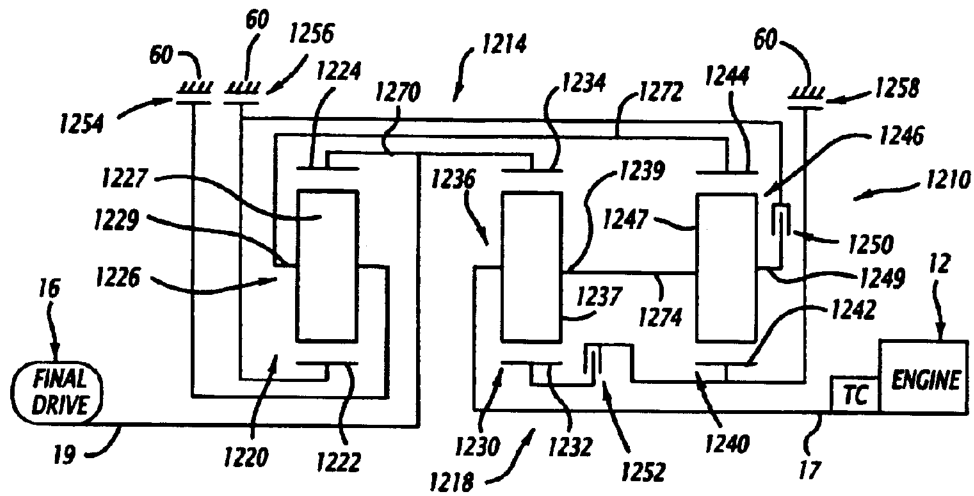
FIG. 19 is a schematic representation of the powertrain incorporating a family member of the present invention.
FIG. 20 is a truth table and chart describing some of the operating characteristics of the family member shown in FIG. 19.

A powertrain 1210, shown in FIG. 19, includes the conventional engine and torque converter 12, a planetary transmission 1214, and the conventional final drive mechanism 16. The planetary transmission 1214 includes the input shaft 17, a planetary gear arrangement 1218, and the output shaft 19. The planetary gear arrangement 1218 includes three planetary gearsets 1220, 1230, and 1240 and five torque-transmitting mechanism 1250, 1252, 1254, 1256 and 1258. The torque-transmitting mechanisms 1250 and 1252 are of the rotating type torque-transmitting mechanisms, or clutches, and the torque-transmitting mechanisms 1254, 1256 and 1258 are of stationary type torque-transmitting mechanisms, or brakes. The torque-transmitting mechanisms 1254, 1256 and 1258 are connected with the transmission housing 60.

The planetary gearset 1220 includes a sun gear member 1222, a ring gear member 1224, and a planet carrier assembly member 1226. The planet carrier assembly member 1226 includes a plurality of pinion gears 1227 rotatably mounted on a planet carrier 1229.

The planetary gearset 1230 includes a sun gear member 1232, a ring gear member 1234, and a planet carrier assembly member 1236 that includes a plurality of pinion gears 1237 rotatably mounted on a planet carrier 1239.

The planetary gearset 1240 includes a sun gear member 1242, a ring gear member 1244, and a planet carrier assembly member 1246. The planet carrier assembly member 1246 includes a plurality of pinion gears 1247 rotatably mounted on a planet carrier 1249.

The ring gear members 1224 and 1234 are continuously connected with an interconnecting member 1270, which is also connected with the output shaft 19. The planet carrier assembly member 1226 and the ring gear member 1244 are continuously interconnected by an interconnecting member 1272, and selectively connectable with the transmission housing 60 through the torque-transmitting mechanism 1254. The planet carrier assembly members 1236 and 1246 are continuously interconnected with each other and with the input shaft 17 through an interconnecting member 1274, which is also selectively connectable through the torque-transmitting mechanism 1250 with the sun gear member 1222. The sun gear member 1242 is selectively connectable with the sun gear member 1232 through the torque-transmitting mechanism 1252 and with the transmission housing 60 through the torque-transmitting mechanism 1258. The sun gear member 1222 is selectively connectable with the transmission housing 60 through the torque-transmitting mechanism 1256.

The truth table shown in FIG. 20 defines the combinations of engagements utilized by the torque-transmitting mechanisms to establish six forward speed ratios and one reverse speed ratio through the planetary gear arrangement 1218 between the input shaft 17 and the output shaft 19. This truth table also includes an example of the numerical values for these ratios. The numerical values have been determined utilizing the ring gear/sun gear tooth ratios given in FIG. 20. The R1/S1 value is the ring gear/sun gear tooth ratio of the planetary gearset 1220; the R2/S2 value is the ring gear/sun gear tooth ratio of the planetary gearset 1230; and the R3/S3 value is the ring gear/sun gear tooth ratio of the planetary gearset 1240. Those skilled in the art will recognize that the numerical value of the reverse speed ratio is determined by the ring gear/sun gear tooth ratio of the planetary gearset 1220.

The numerical value of the first forward speed ratio is determined utilizing the ring gear/sun gear tooth ratios of the planetary gearsets 1230 and 1240. The numerical value of the second forward speed ratio is determined utilizing the ring gear/sun gear tooth ratios of all three planetary gearsets 1220, 1230, and 1240. The third forward speed ratio is a direct drive or 1:1 ratio. The numerical value of the fourth forward speed ratio is determined utilizing the ring gear/sun gear tooth ratio of the planetary gearset 1230. The numerical values of the fifth and sixth forward speed ratios are determined utilizing the ring gear/sun gear tooth ratios of the planetary gearsets 1220 and 1240. It is also evident from the truth table that each of the single step forward ratio interchanges is of the single transition variety. Each of the double step forward ratio interchanges is also of the single transition variety.

The chart of FIG. 20 provides examples of ratio steps for adjacent forward ratios as well as between the reverse and first forward speed ratio. The chart also provides the value of the overall ratio spread of the forward speed ratios.

Figures 21, 22:
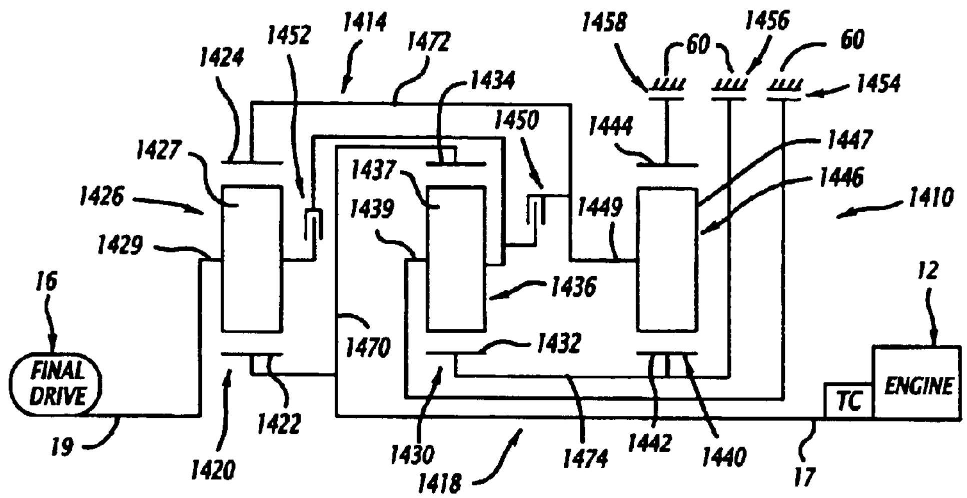
FIG. 21 is a schematic representation of the powertrain incorporating a family member of the present invention.
FIG. 22 is a truth table and chart describing some of the operating characteristics of the family member shown in FIG. 21.

A powertrain 1410, shown in FIG. 21, includes the conventional engine and torque converter 12, a planetary transmission 1414, and the conventional final drive mechanism 16. The planetary transmission 1414 includes the input shaft 17, a planetary gear arrangement 1418, and the output shaft 19. The planetary gear arrangement 1418 includes three planetary gearsets 1420, 1430, and 1440 and five torque-transmitting mechanism 1450, 1452, 1454, 1456 and 1458. The torque-transmitting mechanisms 1450 and 1452 are of the rotating type torque-transmitting mechanisms, or clutches, and the torque-transmitting mechanisms 1454, 1456 and 1458 are of stationary type torque-transmitting mechanisms, or brakes. The torque-transmitting mechanisms 1454, 1456 and 1458 are connected with the transmission housing 60.

The planetary gearset 1420 includes a sun gear member 1422, a ring gear member 1424, and a planet carrier assembly member 1426. The planet carrier assembly member 1426 includes a plurality of pinion gears 1427 rotatably mounted on a planet carrier 1429.

The planetary gearset 1430 includes a sun gear member 1432, a ring gear member 1434, and a planet carrier assembly member 1436 that includes a plurality of pinion gears 1437 rotatably mounted on a planet carrier 1439.

The planetary gearset 1440 includes a sun gear member 1442, a ring gear member 1444, and a planet carrier assembly member 1446. The planet carrier assembly member 1446 includes a plurality of pinion gears 1447 rotatably mounted on a planet carrier 1449.

The sun gear member 1422 and ring gear member 1434 are continuously interconnected by an interconnecting member 1470, which is also continuously connected with the input shaft 17. The ring gear member 1424 and planet carrier assembly member 1446 are continuously interconnected by an interconnecting member 1472. The sun gear members 1432 and 1442 are continuously interconnected by an interconnecting member 1474. The planet carrier assembly member 1426 is continuously connected with the output shaft 19, and selectively connectable to the torque-transmitting mechanism 1452 with the planet carrier assembly member 1436. The planet carrier assembly member 1436 is selectively connectable with the interconnecting member 1472 through the torque-transmitting mechanism 1450, and with the transmission housing 60 through the torque-transmitting mechanism 1454. The interconnecting member 1474 is selectively connectable with the transmission housing 60 through the torque-transmitting mechanism 1456. The ring gear member 1444 is selectively connectable with the transmission housing 60 through the torque-transmitting mechanism 1458.

The truth table shown in FIG. 22 describes the combination of engagements of the torque-transmitting mechanisms, which will permit the establishment of the reverse speed ratio, and the six forward speed ratios between the input shaft 17 and the output shaft 19. The truth table also provides a set of numerical values for these ratios that are determined utilizing the examples of tooth ratios given in FIG. 22. The R1/S1 value is the ring gear/sun gear tooth ratio of the planetary gearset 1420; the R2/S2 value is the ring gear/sun gear tooth ratio of the planetary gearset 1430; and the R3/S3 value is the ring gear/sun gear tooth ratio of the planetary gearset 1440.

The chart of FIG. 22 utilizes these tooth ratios to provide an example of possible ratio steps between adjacent forward speed ratios and between the reverse and first forward speed ratio. The chart also provides an overall ratio spread of the forward speed ratios. Those skilled in the art will recognize that each of the single step ratio interchanges between adjacent forward speed ratios are single transition shift interchanges, and each of the double step ratio interchanges in the forward direction are also single transition interchanges. Those skilled in the art will also recognize that the numerical value of the reverse speed ratio is determined utilizing the ring gear/sun gear tooth ratios of all three planetary gearsets 1420, 1430, and 1440.

The numerical values of the first and second forward speed ratios are determined utilizing the ring gear/sun gear tooth ratios of all three planetary gearsets 1420, 1430, and 1440. The numerical value of the third forward speed ratio is determined utilizing the ring gear/sun gear tooth ratio of the planetary gearset 1420. The numerical value of the fourth forward speed ratio is determined utilizing the ring gear/sun gear tooth ratio of the planetary gearset 1430. The numerical value of the fifth forward speed ratio is determined utilizing the ring gear/sun gear tooth ratios of the planetary gearsets 1420 and 1430. The sixth forward speed ratio is a direct drive, or a 1:1 ratio. The first through fifth forward speed ratios are all underdrive ratios.

What is claimed is:

1. A multi-speed transmission comprising:

an input shaft;

an output shaft;

a transmission housing;

first, second and third planetary gear sets each having first, second and third members;

a first interconnecting member continuously interconnecting said first member of said first planetary gear set with said first member of said second planetary gear set;

a second interconnecting member continuously interconnecting said second member of said first planetary gear set with said first member of said third planetary gear set;

a third interconnecting member continuously interconnecting said second member of said second planetary gear set with said second member of said third planetary gear set;

said input shaft being continuously interconnected with at least one member of said planetary gear sets, and said output shaft being continuously interconnected with at least one other member of said planetary gear sets; and five selectively engageable torque-transmitting mechanisms that selectively interconnect members of said planetary gear sets with one of the other members of said planetary gear sets or said transmission housing, in distinct pairs, and being selectively engageable in combinations of two to establish at least six forward speed ratios and at least one reverse speed ratio between said input shaft and said output shaft, wherein:

said input shaft is continuously connected with said third member of said first planetary gear set, said output shaft is continuously connected with said third interconnecting member, said first torque-transmitting mechanism selectively interconnecting said input shaft with said third member of said third planetary gear set, said second torque-transmitting mechanism selectively interconnecting said input shaft with said first interconnecting member or selectively interconnecting said third member of said second planetary gear set with said second interconnecting member, said third torque-transmitting mechanism selectively interconnecting said third member of said third planetary gear set with said transmission housing, said fourth torque-transmitting mechanism selectively interconnecting said second interconnecting member with said transmission housing, said fifth torque-transmitting mechanism selectively interconnecting said third member of said second planetary gear set or said first interconnecting member with said transmission housing, or said input shaft is continuously connected with said third member of said first planetary gear set, said output shaft is continuously connected with said third member of said third planetary gear set, said first torque-transmitting mechanism selectively interconnecting one of said interconnecting members with another member of said planetary gear sets, said second torque-transmitting mechanism selectively interconnecting one of said third member of said planetary gear sets with another member of said planetary gear sets, said third torque-transmitting mechanism selectively interconnecting said first or second interconnecting member with said transmission housing, said fourth torque-transmitting mechanism selectively interconnecting said second or third interconnecting member with said transmission housing, said fifth torque-transmitting mechanism selectively interconnecting said third interconnecting member or said third member of said second planetary gear set with said transmission housing, or said input shaft is continuously connected with said first interconnecting member, said output shaft is continuously connected with one of said third member of said planetary gear sets, said first torque-transmitting mechanism selectively interconnecting one of said interconnecting members with another member of said planetary gear sets, said second torque-transmitting mechanism selectively interconnecting one of said third member of said planetary gear sets with another member of said planetary gear sets, said third torque-transmitting mechanism selectively interconnecting said second or third interconnecting member with said transmission housing, said fourth torque-transmitting mechanism selectively interconnecting said third interconnecting member or one of said third member of said planetary gear sets with said transmission housing, said fifth torque-transmitting mechanism selectively interconnecting one of said third member of said planetary gear sets with said transmission housing, or said input shaft is continuously connected with said first interconnecting member, said output shaft is continuously connected with said second or third interconnecting member, said first torque-transmitting mechanism selectively interconnecting said third member of said first planetary gear set with said third member of said second planetary gear set, said second torque-transmitting mechanism selectively interconnecting one of said interconnecting members with another member of said planetary gear sets, said third torque-transmitting mechanism selectively interconnecting said third member of said first planetary gear set with said transmission housing, said fourth torque-transmitting mechanism selectively interconnecting said third member of said second or third planetary gear set with said transmission housing, said fifth torque-transmitting mechanism selectively interconnecting said second or third interconnecting member or said third member of said second planetary gear set with said transmission housing.

2. The transmission defined in claim 1, wherein planet carrier assembly member of each of said planetary gear sets is a single-pinion carrier.

3. The transmission defined in claim 1, wherein planet carrier assembly member of at least one of said planetary gear sets is a double-pinion carrier.

4. A multi-speed transmission comprising:

an input shaft;

an output shaft;

a transmission housing;

first, second and third planetary gear sets each having first, second and third members;

a first interconnecting member continuously interconnecting said first member of said first planetary gear set with said first member of said second planetary gear set;

a second interconnecting member continuously interconnecting said second member of said first planetary gear set with said first member of said third planetary gear set;

a third interconnecting member continuously interconnecting said second member of said second planetary gear set with said second member of said third planetary gear set;

said input shaft being continuously interconnected with at least one member of said planetary gear sets, and said output shaft being continuously interconnected with at least one other member of said planetary gear sets; and five selectively engageable torque-transmitting mechanisms that selectively interconnect members of said planetary gear sets with one of the other members of said planetary gear sets or said transmission housing, in distinct pairs, and being selectively engageable in combinations of two to establish at least six forward speed ratios and at least one reverse speed ratio between said input shaft and said output shaft, wherein:

said input shaft is continuously connected with said third member of said first planetary gear set, said output shaft is continuously connected with said third interconnecting member, said first torque-transmitting mechanism selectively interconnecting said input shaft with said third member of said third planetary gear set, said second torque-transmitting mechanism selectively interconnecting said input shaft with said first interconnecting member or selectively interconnecting said third member of said second planetary gear set with said second interconnecting member, said third torque-transmitting mechanism selectively interconnecting said third member of said third planetary gear set with said transmission housing, said fourth torque-transmitting mechanism selectively interconnecting said second interconnecting member with said transmission housing, said fifth torque-transmitting mechanism selectively interconnecting said third member of said second planetary gear set or said first interconnecting member with said transmission housing.

5. A multi-speed transmission comprising:

an input shaft;

an output shaft;

a transmission housing;

first, second and third planetary gear sets each having first, second and third members;

a first interconnecting member continuously interconnecting said first member of said first planetary gear set with said first member of said second planetary gear set;

a second interconnecting member continuously interconnecting said second member of said first planetary gear set with said first member of said third planetary gear set;

a third interconnecting member continuously interconnecting said second member of said second planetary gear set with said second member of said third planetary gear set;

said input shaft being continuously interconnected with at least one member of said planetary gear sets, and said output shaft being continuously interconnected with at least one other member of said planetary gear sets; and five selectively engageable torque-transmitting mechanisms that selectively interconnect members of said planetary gear sets with one of the other members of said planetary gear sets or said transmission housing, in distinct pairs, and being selectively engageable in combinations of two to establish at least six forward speed ratios and at least one reverse speed ratio between said input shaft and said output shaft, wherein:

said input shaft is continuously connected with said third member of said first planetary gear set, said output shaft is continuously connected with said third member of said third planetary gear set, said first torque-transmitting mechanism selectively interconnecting one of said interconnecting members with another member of said planetary gear sets, said second torque-transmitting mechanism selectively interconnecting one of said third member of said planetary gear sets with another member of said planetary gear sets, said third torque-transmitting mechanism selectively interconnecting said first or second interconnecting member with said transmission housing, said fourth torque-transmitting mechanism selectively interconnecting said second or third interconnecting member with said transmission housing, said fifth torque-transmitting mechanism selectively interconnecting said third interconnecting member or said third member of said second planetary gear set with said transmission housing.

6. A multi-speed transmission comprising:

an input shaft;

an output shaft;

a transmission housing;

first, second and third planetary gear sets each having first, second and third members;

a first interconnecting member continuously interconnecting said first member of said first planetary gear set with said first member of said second planetary gear set;

a second interconnecting member continuously interconnecting said second member of said first planetary gear set with said first member of said third planetary gear set;

a third interconnecting member continuously interconnecting said second member of said second planetary gear set with said second member of said third planetary gear set;

said input shaft being continuously interconnected with at least one member of said planetary gear sets, and said output shaft being continuously interconnected with at least one other member of said planetary gear sets; and five selectively engageable torque-transmitting mechanisms that selectively interconnect members of said planetary gear sets with one of the other members of said planetary gear sets or said transmission housing, in distinct pairs, and being selectively engageable in combinations of two to establish at least six forward speed ratios and at least one reverse speed ratio between said input shaft and said output shaft, wherein:

said input shaft is continuously connected with said first interconnecting member, said output shaft is continuously connected with one of said third member of said planetary gear sets, said first torque-transmitting mechanism selectively interconnecting one of said interconnecting members with another member of said planetary gear sets, said second torque-transmitting mechanism selectively interconnecting one of said third member of said planetary gear sets with another member of said planetary gear sets, said third torque-transmitting mechanism selectively interconnecting said second or third interconnecting member with said transmission housing, said fourth torque-transmitting mechanism selectively interconnecting said third interconnecting member or one of said third member of said planetary gear sets with said transmission housing, said fifth torque-transmitting mechanism selectively interconnecting one of said third member of said planetary gear sets with said transmission housing.

7. A multi-speed transmission comprising:

an input shaft;

an output shaft;

a transmission housing;

first, second and third planetary gear sets each having first, second and third members;

a first interconnecting member continuously interconnecting said first member of said first planetary gear set with said first member of said second planetary gear set;

a second interconnecting member continuously interconnecting said second member of said first planetary gear set with said first member of said third planetary gear set;

a third interconnecting member continuously interconnecting said second member of said second planetary gear set with said second member of said third planetary gear set;

said input shaft being continuously interconnected with at least one member of said planetary gear sets, and said output shaft being continuously interconnected with at least one other member of said planetary gear sets; and five selectively engageable torque-transmitting mechanisms that selectively interconnect members of said planetary gear sets with one of the other members of said planetary gear sets or said transmission housing, in distinct pairs, and being selectively engageable in combinations of two to establish at least six forward speed ratios and at least one reverse speed ratio between said input shaft and said output shaft, wherein:

said input shaft is continuously connected with said first interconnecting member, said output shaft is continuously connected with said second or third interconnecting member, said first torque-transmitting mechanism selectively interconnecting said third member of said first planetary gear set with said third member of said second planetary gear set, said second torque-transmitting mechanism selectively interconnecting one of said interconnecting members with another member of said planetary gear sets, said third torque-transmitting mechanism selectively interconnecting said third member of said first planetary gear set with said transmission housing, said fourth torque-transmitting mechanism selectively interconnecting said third member of said second or third planetary gear set with said transmission housing, said fifth torque-transmitting mechanism selectively interconnecting said second or third interconnecting member or said third member of said second planetary gear set with said transmission housing.

* * * * *